United States Patent
Wagner

(10) Patent No.: US 9,427,016 B2
(45) Date of Patent: Aug. 30, 2016

(54) METHOD AND DEVICE FOR MONITORING A PASTEURIZATION INSTALLATION

(75) Inventor: Falko Wagner, Bronshoj (DE)

(73) Assignee: KRONES AG, Neutraubling (DE)

( * ) Notice: Subject to any disclaimer, the term of this patent is extended or adjusted under 35 U.S.C. 154(b) by 679 days.

(21) Appl. No.: 13/201,879

(22) PCT Filed: Feb. 18, 2010

(86) PCT No.: PCT/EP2010/001031
§ 371 (c)(1),
(2), (4) Date: Sep. 8, 2011

(87) PCT Pub. No.: WO2010/094487
PCT Pub. Date: Aug. 26, 2010

(65) Prior Publication Data
US 2011/0313688 A1 Dec. 22, 2011

(30) Foreign Application Priority Data
Feb. 20, 2009 (DE) .......................... 10 2009 009 832

(51) Int. Cl.
*A23L 3/00* (2006.01)
*G01K 17/06* (2006.01)
(52) U.S. Cl.
CPC ............ *A23L 3/003* (2013.01); *G01K 17/06* (2013.01)
(58) Field of Classification Search
CPC ........................... A23L 3/003; G01K 17/06
USPC ........................................................ 702/50
See application file for complete search history.

(56) References Cited

U.S. PATENT DOCUMENTS

| | | | | |
|---|---|---|---|---|
| 4,441,406 A | * | 4/1984 | Becker et al. | 99/275 |
| 4,490,401 A | | 12/1984 | Becker et al. | |
| 4,766,553 A | * | 8/1988 | Kaya et al. | 702/182 |
| 4,841,457 A | | 6/1989 | Clyne et al. | |
| 5,863,579 A | * | 1/1999 | Muzzarelli | 426/231 |
| 2002/0170440 A1 | | 11/2002 | Wakabayashi et al. | |
| 2009/0117237 A1 | | 5/2009 | Hansen et al. | |

FOREIGN PATENT DOCUMENTS

| | | |
|---|---|---|
| CN | 1677065 A | 10/2005 |
| DE | 4010921 A1 | 10/1991 |
| DE | 10310047 A1 | 9/2004 |
| DE | 102005028195 A1 | 12/2006 |

(Continued)

OTHER PUBLICATIONS

Galitsky et al., "Energy Eficiency Improvement and Cost Saving Opportunities for Breweries", Sep. 2003, Ernest Orlando Lawrence Berkeley National Laboratory, pp. 7 & 30.*

(Continued)

*Primary Examiner* — Regis Betsch
(74) *Attorney, Agent, or Firm* — Marshall, Gerstein & Borun LLP

(57) ABSTRACT

A method for monitoring the function of a pasteurization installation, and to a pasteurization installation having a device for monitoring the function, providing a quick and simple way of detecting malfunctions. For this purpose, a theoretical expected value of the resource consumption, in particular of the energy and/or water consumption, is calculated, the actual value is determined and from a deviation between the expected value and the actual value a malfunction of the pasteurization installation is concluded.

13 Claims, 2 Drawing Sheets

(56) References Cited

FOREIGN PATENT DOCUMENTS

| DE | 102005042783 A1 | 3/2007 |
|----|----|----|
| EP | 0960574 A1 | 12/1999 |
| EP | 1106083 A1 | 6/2001 |
| WO | WO-2004066756 A1 | 8/2004 |
| WO | WO-2007028437 A2 | 3/2007 |

OTHER PUBLICATIONS

Geldermann et al., "Integrated technique assessment based on the pinch analysis appraoch for the design of production networks", available online Mar. 14, 2005, European Journal of Operational Research, vol. 171, pp. 1020-1032.*

OSHA, Osha Technical Manual, Section III: Chapter 4, Heat Stress, Jan. 20, 1999, pp. 1-9.*

Dilay et al., "Modeling simulation and optimization of a beer pasteurization tunnel", 2005, J of Food Eng. 77, (2006) 500-513.*

Earle et al., "Unit Operations in Food Processing", Web edition 2004, Chapters 1-6, The New Zealand Institute of Food Science & Technology, based on print editions 1966 and 1983, Pergamon Press—http://www.nzifst.org.nz/unitoperations/.*

The State Intellectual Property Office of the People's Republic of China, Notification of the First Office Action for Application Nol 201080008844.0, dated Dec. 6, 2012.

International Search Report for PCT/EP2010/001031 dated Jul. 26, 2010.

Dilay et al., Modeling, Simulation and Optimization of a Beer Pasteurization Tunnel, Journal of Food Engineering, Barking, Essex, GB LNKD, vol. 77, No. 3, pp. 500-513, Dec. 1, 2006.

German Search Report for 10 2009 009 832.1, dated Jan. 19, 2012.

* cited by examiner

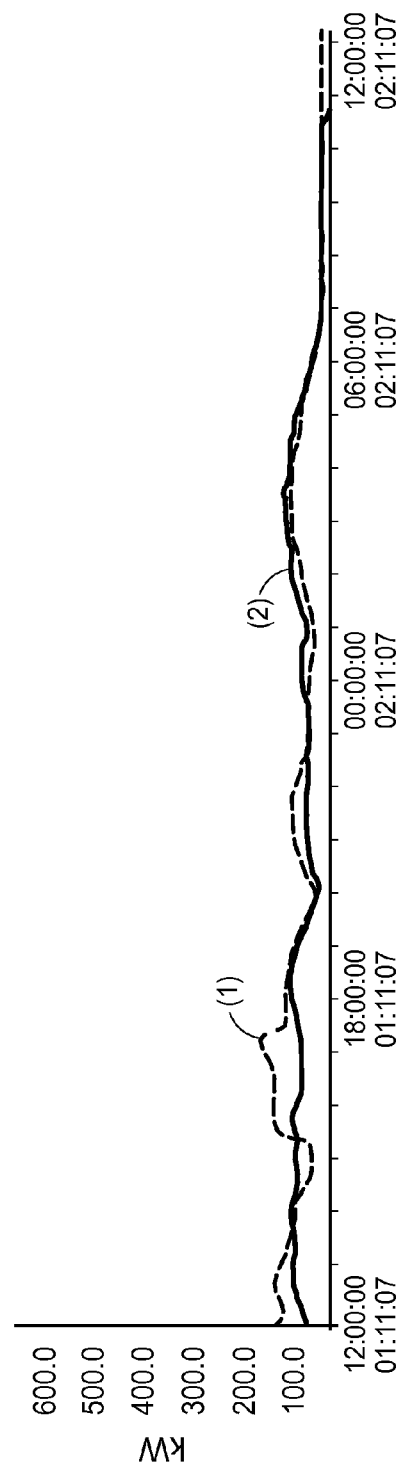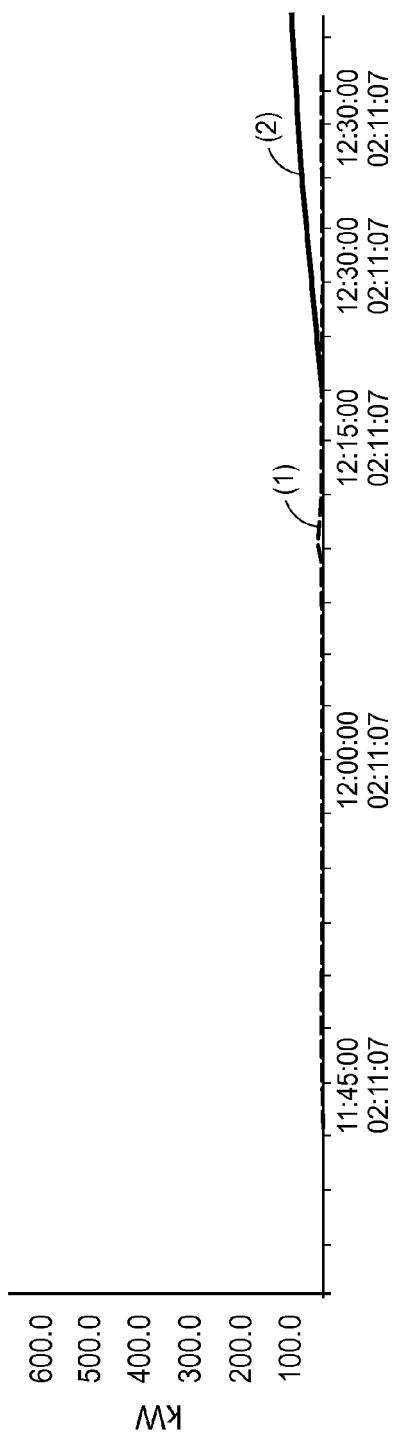

METHOD AND DEVICE FOR MONITORING A PASTEURIZATION INSTALLATION

CROSS-REFERENCE TO RELATED APPLICATION

The present application claims the benefit of priority of International Patent Application No. PCT/EP2010/001031, filed Feb. 18, 2010, which application claims priority of German Application No. 102009009832.1, filed Feb. 20, 2009. The entire text of the priority application is incorporated herein by reference in its entirety.

FIELD OF THE DISCLOSURE

The disclosure relates to a method and a device for monitoring the function of a pasteurization installation, such as used in bottling operations.

BACKGROUND

Up to now, the consumption of energy and water in pasteurization installations, such as a tunnel pasteurization installation, have only been measured and recorded, it was, however, up to the operator to use these information to analyze and evaluate the performance of the pasteurization installation. This was rarely done more than once or twice per year. Moreover, it was up to the operator to determine which values are still acceptable, or which values possibly indicate a malfunction of the pasteurization installation. Resource losses, for example loss of energy and water, were accordingly bound to occur.

One aspect of the disclosure is to provide a method for monitoring the function of a pasteurization installation and a pasteurization installation equipped with a corresponding device for monitoring the function, by means of which the function of the pasteurization installation can be quickly and simply monitored and malfunctions can be detected early.

The device according to the disclosure forms an early warning system for a possible malfunction of components by means of which resource consumption can be determined and compared to a theoretical expected value. The disclosure permits to employ a mathematical model which determines a malfunction of the installation long before the operator has gathered sufficient experience with the "normal" consumption of resources, such as energy and water, to be able to asses when an increased consumption is caused by an error in the installation. By the embodiment according to the disclosure, the mathematical model can be drawn up for the complete pasteurization installation, so that all (important) functions leading to increased resource consumption in case of a failure can be monitored. In this manner, the operator is able to take corrective measures early.

With the present disclosure, it is possible to automatically analyze and evaluate the current consumption and to emit a warning message as soon as a deviation between the actual value and the theoretical expected value of consumption can be detected, which is usually possible within one to two hours. By this, the operator is enabled to immediately correct a possible error of a component, thus avoiding a loss of resources, such as energy and water, over months.

Applied to a tunnel pasteurization installation comprising treatment zones through which the products, such as containers or, which will be presumed below, bottles, pass in a row, the current product temperature is calculated, based on a mathematical model for the product temperature, for each row of bottles in the tunnel pasteurization installation at an interval of seconds. This is in turn used to calculate the theoretical energy consumption.

The theoretical energy consumption for each row of bottles is added up for all rows of bottles in each zone of the tunnel pasteurization installation. This results in the theoretical energy consumption, positive or negative, for each zone. The theoretical energy consumption for each zone can be either negative or positive. If it is negative, it is converted into a theoretical water consumption for cooling. If it is positive, it is converted into a theoretical energy consumption for heating.

The resulting theoretical water and energy consumption for each zone is then in each case compared to the measured consumption of water and energy in this certain zone. If the actual consumption either of water or energy is higher than the theoretical consumption, an alarm message is displayed or generated.

This permits the operator to detect potential malfunctions of components or material failure much earlier than it is possible during the normal procedure. Usually, the water and energy balance of a pasteurization installation is monitored and analyzed once every two to three months. This leads to an energy or water consumption which is too high over a long period before the problem is detected and its cause is found and can be eliminated.

By the present disclosure, the pasteurization installation obtains a device by means of which excessive energy and water consumption can be detected within one day and suited countermeasures can be initiated to avoid extended energy and water loss.

BRIEF DESCRIPTION OF THE DRAWINGS

FIG. 1 shows the recorded total energy consumption compared to the expected value of consumption.

FIG. 2 shows an example of how a lack of concordance between the theoretical (1) and the actual (2) consumption can be used to represent an alarm that shows the operator where in the system he has to look for possible component errors.

DETAILED DESCRIPTION OF THE PREFERRED EMBODIMENT

Figure 3:
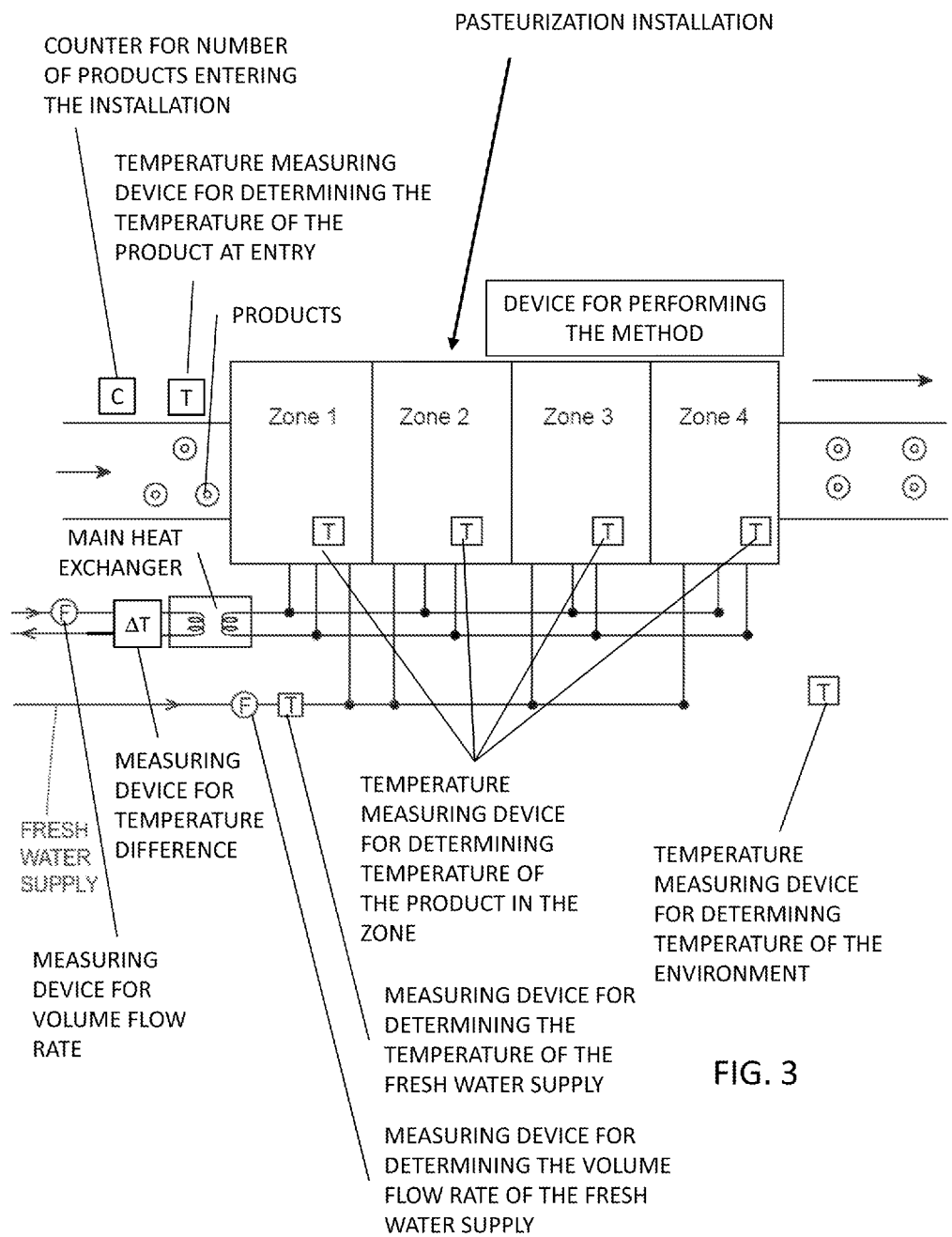
FIG. 3 is a semi-schematic view of a pasteurization Installation in accordance witan embodiment of the disclosure.

Below, the measurements of energy and water consumption will be described in detail, followed by the calculation of the theoretical expected value of consumption.

Measurements of the Actual Value of Energy Consumption

The actual energy consumption is measured by suited measuring devices via the volume flow rate through and the temperature difference across a central heat exchanger supply system (CHESS). The total energy consumption is calculated by:

$$Q_H = mC_p dT\eta \quad (1)$$

where m is the mass flow through the heat exchanger system, $C_p$ is the heat capacity of water, dT the temperature difference across the heat exchanger system, and $\eta$ the performance of the heat exchanger in the heat exchanger system.

If the actual total energy is given, it must be distributed to the individual zones. The total flow is the sum of the flow to the individual zones, predetermined by:

$$F_{Total} = \Sigma(f_i v_i \phi_i) = m \quad (2)$$

where F is the total flow, $f_i$ is the maximum flow through the cooling valve of the examined zone i, $v_i$ is the opening of the cooling valve of zone i (between 0 and 1), and $\phi$ is the construction factor for the determined valve in zone i, depending on the situation in the water system.

The flow through the individual zone is then found by:

$$f_i = F_{Total}(v_i\phi_i)/\Sigma(v_i\phi_i) \qquad (4)$$

Measurement of the Actual Water Consumption

The actual value of the actual water consumption is measured by the flow meter in the fresh water conduit. This total flow is distributed to the individual zones by:

$$f_i = F_{Total}(v_i\phi_i)/\Sigma(v_i\phi_i) \qquad (5)$$

Calculation of the Theoretical Expected Value of Energy Consumption

The theoretical expected value of energy consumption consists of three parts: the energy take-up of the products, the energy loss to the environment, and the energy loss between the zones.

Energy Take-up by the Products

For each procedure step, energy consumption in a product is calculated by the energy difference between the temperature measured by temperature measuring means before and after ($T_{content}$ and $T_{content-OLD}$). As the cycle time for each procedure step is 1 second, the energy flow into a product can be easily calculated by:

$$Q_P = m_P C_P (T_{content} - T_{content\_OLD}) \qquad (6)$$

which must in turn be multiplied by the number of products which stand in the installation side by side:

$$n = \frac{D_p b n_{decks} \theta}{\frac{D_p^2}{4}\pi} \qquad (7)$$

wherein $D_p$ is the diameter of the products, b the treatment width of the pasteurizer, $n_{decks}$ the number of decks, and $\theta$ the bulk density or the bulk factor.

This must be compiled for all products in each zone:

$$Q_{P,Zone} = \sum_{Rows\ in\ zone} Q_P n \qquad (8)$$

and for the total energy consumption as a sum of all product rows:

$$Q_{P,TOT} = \sum_{MaxAUZ} Q_P n \qquad (9)$$

Important information which is required for the calculation to be correct is the bulk factor or the bulk density, respectively. Accordingly, a measurement of the number of products which enter the pasteurization installation must be performed. This can be either performed by a product counter at the entry of the pasteurization installation, or, when using the speed of the filler upstream of the pasteurization installation, as a time-displaced signal for the pasteurization installation itself.

Energy Loss to the Environment

For each zone, the energy loss to the environment is calculated by:

$$Q_L = k A_Z (T_Z - T_{env}) \qquad (10)$$

wherein k means the heat transfer coefficient to the environment, $T_Z$ the temperature in the zone, $T_{env}$ the temperature of the environment, and $A_Z$ the area of the zone.

The value must be added up for all zones to obtain the total energy loss of the pasteurizer by:

$$Q_{L,TOT} = \sum_{AZ} Q_L \qquad (11)$$

The most important information here is the existence of an ambient temperature measurement which must be performed by means of a temperature measurement means.

Energy Loss to Adjacent Zones

The energy loss to adjacent zones is calculated by the heat transfer coefficient between the zones and the temperature difference of the determined zone with respect to the previous zone and with respect to the following zone, determined by a temperature measuring means, by:

$$Q_N = k_N A_N (T_{Z-1} - T_Z) + k_N A_N (T_Z - T_{Z+1}) \qquad (12)$$

where $k_N$ is the heat transfer coefficient between the zones, $T_Z$ is the zone temperature, and $A_N$ is the area of the heat transfer between the zones (cross-sectional area).

This must be summed up for all zones to obtain the total energy loss of the pasteurization installation by:

$$Q_{N,TOT} = \sum_{AZ} Q_N \qquad (13)$$

Total Energy Consumption of the Zones

The total energy consumption of each zone is the sum of the total energy consumption, as calculated above:

$$Q_{Z,TOT} = Q_P + Q_L + Q_N \qquad (14)$$

Calculation of the Theoretical Expected Value of Water Consumption

If the total energy consumption of a zone is negative, this "cooling" energy is converted into fresh water consumption. This consumption is approximated by the temperature difference between the zone which has to be cooled and the temperature of the fresh water multiplied by the heat capacity of the water to obtain the proportion of water which is necessary to supply the value required by the negative energy consumption to cooling:

$$m_{freshwater} = Q_{Z,TOT}/(C_P dT) \qquad (15)$$

Comparison of the Theoretical Expected Value and the Actual Value of Energy Consumption To analyze the current operating state of the pasteurizer, the actual energy consumption of each zone is compared to the theoretical expected value of energy consumption of this zone. If the difference is greater than a predetermined percentage for a predetermined period, an alarm is emitted.

If this analysis is carried out on a zone level, the operator has an indication of the location of the problem.

Examples of Error Recovery

If a certain zone consumes too much energy compared to the theoretical expected value, this could be an indication of one of the following problems:

The cooling valve in the same zone (if it is a pasteurization zone) or in the corresponding regenerative zone (if it is a regenerative zone) could leak. The additional introduction of cold water which is not detected by the system is counteracted by an increased energy consumption of this zone:

There could be a mixing of water between the zone and its adjacent zone (colder). The additional introduction of cold water which is not detected by the system is counteracted by an increased energy consumption of this zone.

If a certain zone consumes too much water for cooling compared to the theoretical expected value, this could be an indication of one of the following problems:

The heating valve in the same zone (if it is a pasteurization zone) or in the corresponding regenerative zone (if it is a regenerative zone) could leak. The additional introduction of hot water which is not detected by the system is counteracted by an increased water consumption for cooling this zone.

There could be a mixing of water between the zone and its adjacent zone (hotter). The additional introduction of hot water which is not detected by the system is counteracted by an increased water consumption for cooling this zone.

On a scale of the total installation, the actual value of the total energy consumption can also be used to find a problem if one compares this value with the theoretical expected value of energy consumption.

If the actual energy consumption of the complete pasteurizer is higher than the theoretical expected value of the total energy consumption, this could be an indication of one of the following problems:

The heat exchanger is clogged and cannot ensure the desired flow through the system.

A structural problem has occurred in the buffer system of the pasteurizer, and there is a mixing of water in the buffer system.

Examples of Use

Again, FIG. 1 shows the recorded total energy consumption compared to the expected value of consumption. During normal operation, the result shows good concordance between the theoretical expected value (1) of energy consumption drawn in a dashed line, calculated by the method of the present disclosure, and the actual value (2) of energy consumption represented in a solid line.

Again, FIG. 2 shows an example of how a lack of concordance between the theoretical (1) and the actual (2) consumption can be used to represent an alarm that shows the operator where in the system he has to look for possible component errors. In FIG. 2, the relations for a zone are represented, where it strikes that in the right portion of the diagram, the measured energy consumption increases compared to the theoretical expected value.

Instead of or in addition to the graphical representation by curves according to FIG. 2, a column chart can also be employed in which the deviations are represented, for example, as a column, and exceeding of the expected values is drawn in red.

CONCLUSION

By calculating and comparing the theoretical energy and water consumption of the individual zones and the complete pasteurization installation, an early warning model for a possible failure of components is drawn up. This can drastically reduce energy and water losses of the tunnel pasteurization installation as the operator receives a direct warning indicating that something is not in order.

Instead of waiting for several months before the energy and water balances are analyzed and compared to earlier periods, the problem can now be realized and localized on the very day of its occurrence, thus minimizing the loss of energy and water.

The invention claimed is:

1. A method of monitoring the function of a pasteurization installation providing treatment for products and having at least two zones cooled by supplying fresh water from a fresh water supply via a fresh water conduit, comprising:
calculating a theoretical expected value of an energy and a water consumption, determining an actual value of the energy and the water consumption, and concluding, from a deviation between the theoretical expected value and the actual value, a malfunction of the pasteurization installation,
wherein the theoretical expected value of the energy consumption is calculated via an energy take-up of each of the products and at least one of an energy loss to an environment of the pasteurization installation or an energy loss between the at least two zones of the pasteurization installation,
wherein the actual value of the energy consumption is determined via a volume flow rate through and a temperature difference across a main heat exchanger system, the main heat exchanger system configured to transfer heat to each of the at least two zones,
and
wherein the theoretical expected value of the water consumption is calculated based on differences between temperatures of the at least two zones to be cooled and a temperature of the fresh water multiplied with a heat capacity of the fresh water, and
wherein the actual value of the water consumption is determined by measuring a flow rate of the fresh water through the fresh water conduit, wherein the fresh water through the fresh water conduit is supplied to each of the at least two zones.

2. The method according to claim 1, wherein the pasteurization installation providing treatment for products is divided into several zones, and the actual value and the expected value are treated relating to the several zones.

3. The method according to claim 2, wherein the theoretical expected value of the energy consumption is further calculated based on a product temperature, where the product temperature is detected by a combination of a temperature of a zone of the at least two zones and a heat transfer parameter to be predetermined.

4. The method according to claim 1, wherein the theoretical expected value of the water consumption is further calculated based on a difference between a temperature of the products to be cooled and the temperature of the fresh water.

5. A pasteurization installation for products, comprising a device for performing the method according to claim 1, wherein the device comprises a measuring device for determining the volume flow rate and a temperature difference across the main heat exchanger system, and the device further comprises a measuring device for the flow rate of the fresh water through the fresh water conduit.

6. A pasteurization installation according to claim 5, wherein the device comprises a temperature measuring device located at least one of in at least one zone or at an entry side of the pasteurization installation for determining a product temperature.

7. A pasteurization installation according to claim 5, wherein the device comprises a temperature measuring device located in the environment of the pasteurization installation for determining a temperature of the environment of the pasteurization installation.

8. A pasteurization installation according to claim 5, wherein the device comprises a temperature measuring device located in the fresh water conduit or the fresh water supply for determining the temperature of the fresh water.

9. A pasteurization installation according to claim 5, wherein the device comprises a counting means for counting a number of the products entering the pasteurization installation.

10. A pasteurization installation according to claim 5, wherein the device is configured to receive a time-displaced speed signal from a filler upstream the pasteurization installation.

11. A method of monitoring a pasteurization installation in a main heat exchanger system providing treatment for products and having at least two zones to be cooled by supplying fresh water from a fresh water supply via a fresh water conduit, comprising:
- calculating a theoretical expected value of an energy consumption based on a product temperature and a predetermined heat transfer parameter;
- calculating a theoretical expected value of a water consumption based on temperatures of the at least two zones to be cooled and a temperature of the fresh water;
- determining an actual value of the energy consumption based on a volume flow rate through the main heat exchanger system and a temperature difference across the main heat exchanger system, the main heat exchanger system configured to transfer heat to each of the at least two zones;
- determining an actual value of the water consumption based on a flow rate of the fresh water through the fresh water conduit measured by a flow meter in the fresh water conduit, wherein the fresh water through the fresh water conduit is supplied to each of the at least two zones;
- calculating a first deviation between the theoretical expected value of the energy consumption and the actual value of the energy consumption;
- calculating a second deviation between the theoretical expected value of the water consumption and the actual value of the water consumption; and
- concluding, based on at least one of the first deviation and the second deviation, a malfunction of the pasteurization installation.

12. The method of claim 11, wherein determining the actual value of the energy consumption is further based on a performance of a heat exchanger in the main heat exchanger system.

13. The method of claim 11, wherein the main heat exchanger system comprises multiple zones and wherein calculating the theoretical expected value of the energy consumption is further based on an energy loss to adjacent zones of the multiple zones.

* * * * *